United States Patent
Slamani et al.

(10) Patent No.: US 10,181,915 B1
(45) Date of Patent: Jan. 15, 2019

(54) PHASE MEASUREMENT FOR PHASED ARRAY DEVICES USING SHARED LOCAL OSCILLATOR AND SYNCHRONIZED DIGITIZER

(71) Applicant: GLOBALFOUNDRIES INC., Grand Cayman (KY)

(72) Inventors: Mustapha Slamani, South Burlington, VT (US); Timothy M. Platt, Williston, VT (US); Thomas Moon, Savoy, IL (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 16/006,028

(22) Filed: Jun. 12, 2018

(51) Int. Cl.
*H04B 3/46* (2015.01)
*H04B 17/29* (2015.01)

(52) U.S. Cl.
CPC .................... *H04B 17/29* (2015.01)

(58) Field of Classification Search
CPC ...................................... H04B 17/29
USPC ............... 375/224, 226, 295, 316, 332, 228; 324/637, 650, 76.23, 76.19, 754.03, 615, 324/527, 600; 455/63.1, 286, 326, 67.11
See application file for complete search history.

(56) References Cited

U.S. PATENT DOCUMENTS

| | | | |
|---|---|---|---|
| 3,378,846 A | 4/1968 | Lowenschuss | |
| 5,081,460 A | 1/1992 | Liu | |
| 5,294,934 A | 3/1994 | Matsumoto | |
| 5,566,088 A | 10/1996 | Herscher et al. | |
| 6,484,124 B1 | 11/2002 | MacMullen | |
| 7,167,682 B1 * | 1/2007 | Madsen | H04B 17/15 455/115.1 |
| 8,296,086 B2 | 10/2012 | Sternberg et al. | |
| 8,583,049 B2 * | 11/2013 | Collins, III | H03D 7/1441 455/226.1 |
| 9,214,726 B2 | 12/2015 | Aydin et al. | |
| 9,252,895 B1 * | 2/2016 | Verspecht | H03D 7/1441 |
| 9,753,071 B1 | 9/2017 | Martens | |

* cited by examiner

*Primary Examiner* — Dhaval Patel
(74) *Attorney, Agent, or Firm* — Gibb & Riley, LLC; Anthony J. Canale

(57) ABSTRACT

A local oscillator signal is output from a local oscillator using a reference signal produced by a reference signal generator. Similarly, a test intermediate frequency signal is output from a source oscillator using the reference signal. The test intermediate frequency signal is converted to a test radio frequency signal, with an up-converter using the local oscillator signal. The test radio frequency signal is supplied to a device under test, and an output radio frequency signal is received back from the device under test. The output radio frequency signal is converted to an output intermediate frequency signal, with a down-converter using the local oscillator signal. The output intermediate frequency signal is converted to a digital output signal, with a synchronized digitizer using the reference signal. Different phase signals of the output intermediate frequency signal are captured using the synchronized digitizer as the device under test is operated during a testing cycle.

20 Claims, 6 Drawing Sheets

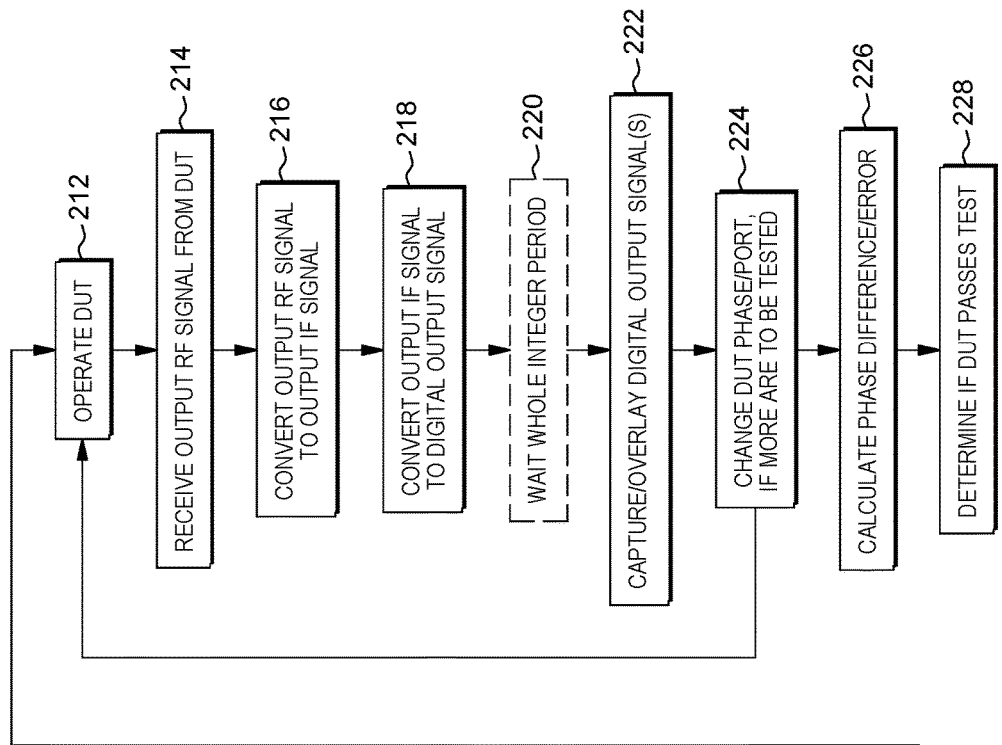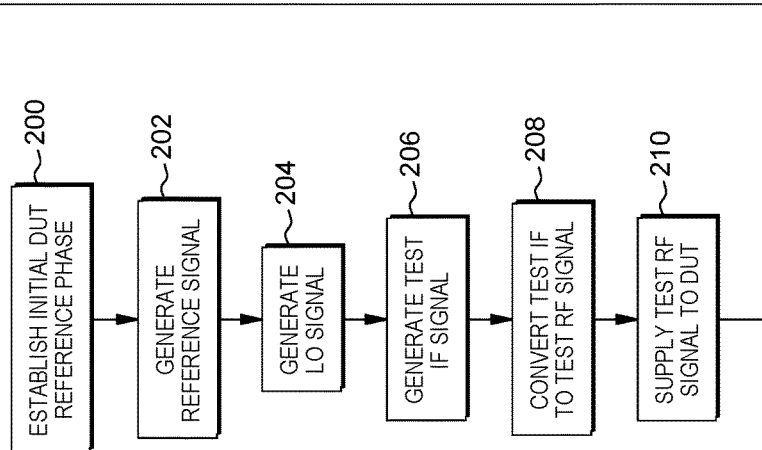
FIG. 4

PHASE MEASUREMENT FOR PHASED ARRAY DEVICES USING SHARED LOCAL OSCILLATOR AND SYNCHRONIZED DIGITIZER

BACKGROUND

Field of the Invention

The present disclosure relates to the testing of radio frequency (RF) devices, and more specifically, to RF device testing using a local oscillator (LO) signal for mixers.

Description of Related Art

Complementary metal oxide semiconductor (CMOS) transistor devices are commonly used in microwave and radio frequency transmitter and receiver devices (such receivers/transmitters are sometimes simply referred to as "RF devices" herein for ease of nomenclature). Such RF devices need to be thoroughly tested, which can be challenging because these RF devices can be designed to perform with millimeter wavelengths operating at very high frequencies (e.g., 1 GHz-100 GHz).

Commonly, such RF devices have the ability to operate at different phases of a given frequency signal, and/or through different ports of the RF devices, in order to increase the number of devices that can simultaneously communicate with the RF devices. The testing equipment therefore must be able to test the receiver/transmitter at different phases of signal.

Such requirements make testing equipment for such sophisticated RF devices large, slow, and very expensive. Additionally, such test devices can lack accuracy because they can suffer from undesirable noise or other interference.

SUMMARY

In general, devices herein use a shared local oscillator for the upconverter and downconverter. More specifically, exemplary devices herein include a radio frequency test device that includes a reference signal generator producing a reference signal, and a local oscillator connected to the reference signal generator that receives the reference signal from the reference signal generator. The local oscillator outputs a local oscillator signal using the reference signal. Also, a splitter is connected to the local oscillator and receives the local oscillator signal from the local oscillator.

A source oscillator is also connected to the reference signal generator and receives the reference signal from the reference signal generator. The source oscillator outputs a test intermediate frequency signal using the reference signal. An up-converter, which is connected to the splitter, receives the local oscillator signal from the splitter. The up-converter uses the local oscillator signal to convert the test intermediate frequency signal to a test radio frequency signal. The up-converter has a first test connection supplying the test radio frequency signal to a device under test.

Additionally, a down-converter is connected to the splitter and receives the local oscillator signal from the splitter. The down-converter includes a second test connection that receives an output radio frequency signal from the device under test. The down-converter also uses the local oscillator signal to convert the output radio frequency signal to an output intermediate frequency signal.

Such structures further include a synchronized digitizer, connected to the down-converter, which receives the output intermediate frequency signal from the down-converter. The synchronized digitizer is connected to the reference signal generator and also receives the reference signal from the reference signal generator. The synchronized digitizer uses the reference signal to convert the output intermediate frequency signal to a digital output signal. The synchronized digitizer (potentially with operation of a separate logic device) maintains different phase signals of the output intermediate frequency signal from the down-converter as the device under test is operated during a testing cycle. The synchronized digitizer converts the output intermediate frequency signal from a frequency domain to a time domain or uses the fast Fourier transform (FFT), etc. The reference signal supplied to the local oscillator, the source oscillator and the digitizer is the same (e.g., a single) signal.

Also, the aforementioned logic device can be connected to the device under test and the synchronized digitizer (or such logic functions can be incorporated into the synchronized digitizer). The logic device controls the device under test to process the test radio frequency signal at different phase/port steps at different times of the testing cycle. Each of the different phase/port steps causes the device under test to operate using a different phase and/or a different input/output port.

The synchronized digitizer continuously receives the output intermediate frequency signal from the down-converter during the full testing cycle, to maintain all the different phase signals of the output intermediate frequency signal from the down-converter as the device under test is operated during the full testing cycle. The logic device controls the synchronized digitizer to wait whole integer frequency periods between capturing the different phase signals relating to different phase/port steps of the testing cycle. The synchronized digitizer (potentially with operation of the logic device) combines together and overlays the different phase signals relating to different phase/port steps of the testing cycle synchronized with one another. The logic device evaluates offset of the different phases combined and overlaid by the synchronized digitizer to determine whether phases of digital output signals relating to the different phase/port steps of the device under test are within limits to determine whether the device under test passes the testing cycle.

Various methods herein output a local oscillator signal from a local oscillator using a reference signal produced by a reference signal generator. Similarly, such methods output a test intermediate frequency signal from a source oscillator using the reference signal. These methods convert the test intermediate frequency signal to a test radio frequency signal, with an up-converter using the local oscillator signal.

The test radio frequency signal is supplied to a device under test, and an output radio frequency signal is received back from the device under test. More specifically, a logic device can be used to control the device under test to process the test radio frequency signal at different phase/port steps at different times of the testing cycle.

Such methods convert the output radio frequency signal to an output intermediate frequency signal, with a down-converter using the local oscillator signal. Then, the methods convert the output intermediate frequency signal to a digital output signal, with a synchronized digitizer using the reference signal. Again, the reference signal supplied to the local oscillator, the source oscillator and the digitizer is the same (e.g., a single) signal.

This allows these methods to capture different phase signals of the output intermediate frequency signal using the synchronized digitizer as the device under test is operated during a testing cycle. Thus, the methods continuously capture the different phase signals (using the synchronized digitizer) which relate to different phase/port steps of the testing cycle, and that are synchronized with one another when combined and overlaid by the synchronized digitizer. These methods capture such different phase signals by having the synchronized digitizer continuously receive the output intermediate frequency signal from the down-converter during the entire (all of the) testing cycle, and having the logic device control the synchronized digitizer to wait whole integer frequency periods between capturing the different phase signals relating to different phase/port steps of the testing cycle.

The logic device is used by such methods to evaluate offset of the different phases combined and overlaid by the synchronized digitizer to determine whether phases of digital output signals relating to the different phase/port steps of the device under test are within limits, to determine whether the device under test passes the testing cycle.

BRIEF DESCRIPTION OF THE DRAWINGS

The embodiments herein will be better understood from the following detailed description with reference to the drawings, which are not necessarily drawn to scale and in which:

FIG. 4 is a flow diagram illustrating embodiments herein; and

DETAILED DESCRIPTION

Figure 1:
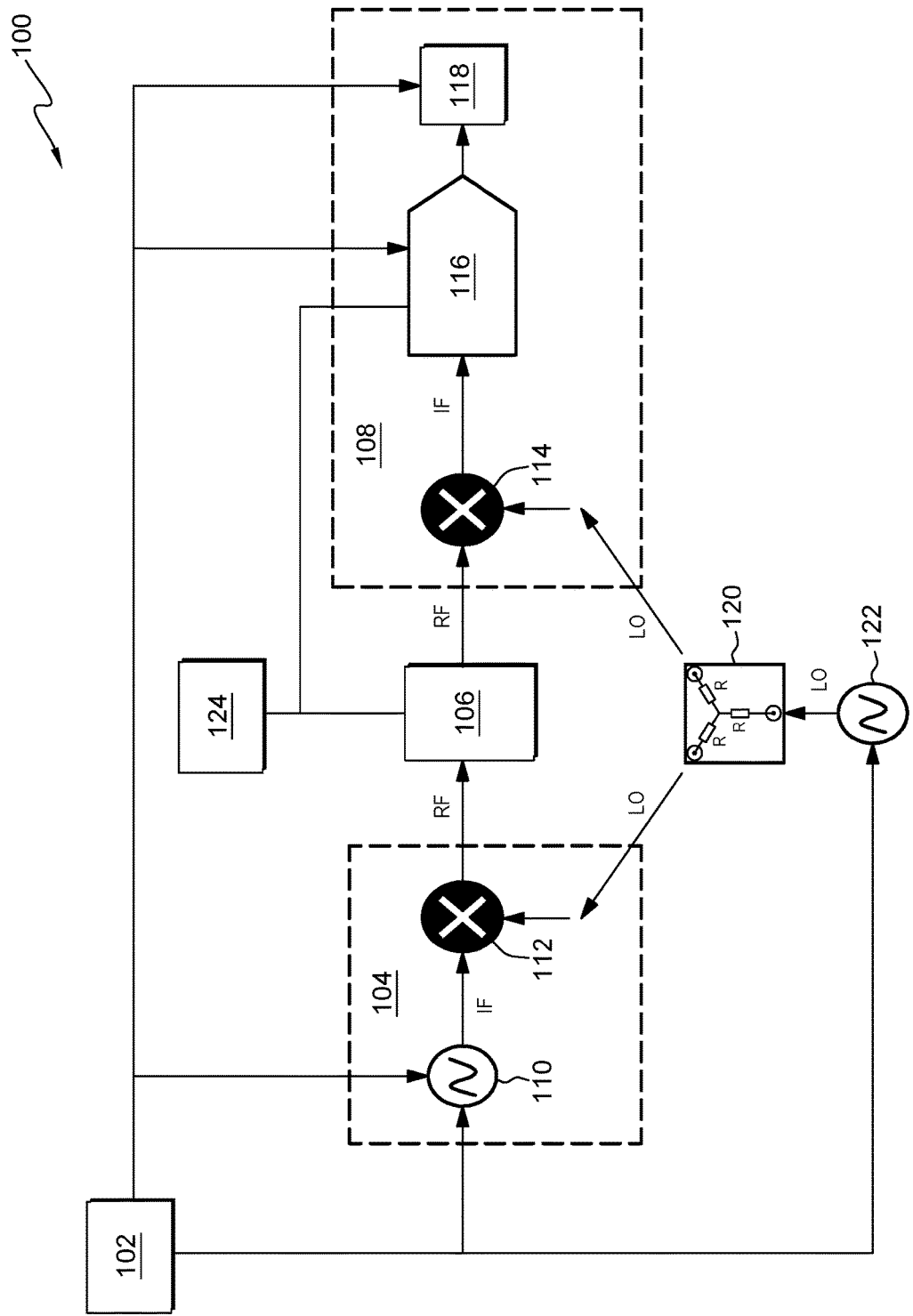
FIG. 1 is a schematic diagram illustrating a testing apparatus according to embodiments herein.

As mentioned above, testing devices for such sophisticated radio frequency (RF) transmitters/receivers can be very slow, large, and expensive, and such test devices can lack accuracy because they suffer from undesirable noise or other interference. For example, with 5G phased array devices, phase measurement should be made between antenna elements. Further, the device under test (DUT) can have a variable phase adjustment circuit that is highly sensitive to fabrication processes, requiring that every produced device be tested. However, no millimeter wave production automatic test equipment (ATE) offers a phase measurement capability. While some bench equipment can measure phase, such are not adequate to support high volume testing of every device produced due to the size, cost, and slow speed of such bench equipment.

When testing RF devices, the RF devices must be supplied with very small wavelength and very high frequency signals; and the RF devices output similar small wavelength/high frequency signals in response to the test signals. However, it can be difficult or expensive to analyze such small wavelength and high frequency signals, so down-converters are used to decrease frequency, where such down-converters reduce RF signals to intermediate frequency (IF) signals that are more easily (and sometimes more accurately) processed by potentially less expensive analysis equipment. If one example, test equipment can utilize one or more RF test signal generators that supply an RF signal to a device under test, and a down-converter (which may not be accurately synchronized with the RF test signal generators) to reduce the frequency of the output signals from the device under test. Again, this frequency reduction allows smaller, less expensive, more reliable test analysis equipment to be utilized.

In order to address issues with RF testing equipment, the methods and devices herein utilize an up-converter and a down-converter that are coordinated/synchronized with one another and therefore use a shared local oscillator for the upconverter and downconverter. More specifically, the up-converter and down-converters described herein can be simple mixers (single ended or differential) or complex blocks having many elements such as filters, amplifiers, attenuators, etc.

In one example, identical mixers with three ports are used as up and down converters to increase/decrease the frequency of RF signals in RF testing equipment. Depending upon how these three ports are connected to the IF signal, the RF signal, and a local oscillator (LO) signal changes the mixer from an up-converter to a down-converter. In such mixers the LO signal is used to increase the frequency of an input IF signal (when supplied to an input port of the mixer) to an output RF signal, and the LO signal is similarly used to decrease the frequency of an input RF signal (when supplied to an input port of the mixer) to an output IF signal. The amount of increase/decrease in frequency is dependent upon the LO signal, which allows the mixers to generate very small differences between RF and IF frequencies (a few percent) or generate very large differences (thousands of times higher/lower frequencies), again based upon the LO signal.

The devices and methods herein supply the same LO signal to both the up-converter and the down-converter (use a shared local oscillator for the upconverter and downconverter), so as to eliminate phase errors by canceling out the phase noise effect between the up-converter and down-converter, and this further increases accuracy. These devices/methods also supply a common frequency reference signal to synchronize all testing equipment and the device under test, to further reduce phase errors. Additionally, these devices and methods use a synchronized digitizer to digitize the down-converted IF signal, where the synchronized digitizer is "synchronized" because it remains on during different phase/port steps to consistently capture different phase signals that are thereby synchronized (when combined and overlaid) with one another. Also, this eliminates the need for path calibration, as only relative (not absolute) phases are measured with such devices and methods, where the relative phase of a phase setup is to another phase setup.

FIG. 1 illustrates one exemplary radio frequency test device 100 that includes a reference signal generator 102 producing a reference signal, which can be any frequency, for example 0.001-1000 MHz (and can be 10 MHz in one implementation). A local oscillator 122 is connected to the reference signal generator 102. As shown in FIG. 1, the local oscillator 122 receives the reference signal from the reference signal generator 102. The local oscillator 122 outputs a local oscillator (LO) signal using the reference signal. Also, a splitter 120 (that may, or may not, be powered for amplification) is connected to the local oscillator 122 and receives the local oscillator signal LO from the local oscillator 122. The splitter 120 provides the exact same LO signal to different devices (potentially amplified).

A source oscillator 110 is also connected to the reference signal generator 102 and receives the reference signal from the reference signal generator 102. The source oscillator 110 outputs a test signal at an intermediate frequency that has lower frequency than the radio frequency (which is, for convenience, referred to herein sometimes as a "test intermediate frequency signal") using the reference signal.

An up-converter 112, that is connected to the splitter 120, receives the local oscillator signal from the splitter 120. The up-converter 112 uses the local oscillator signal LO to convert the test intermediate frequency signal (IF) from the source oscillator to a test radio frequency signal (RF) by increasing the frequency of the test intermediate frequency signal (but not otherwise altering the test intermediate frequency signal). Note that the source oscillator 110 and the up-converter 112 make up what is referred to as the "source" 104, which is the source of the RF signal supplied to the device under test 106. In greater detail, the up-converter 112 has a first test connection supplying the test radio frequency signal to a device under test (DUT) 106.

Additionally, a down-converter 114 is connected to the splitter 120 and receives the local oscillator signal from the splitter 120. The down-converter 114 can be identical (or can be different) to the up-converter 112 and can perform identically (or differently) to the up-converter 112 when supplied with the same inputs, and connections are made to the down-converter 114 to cause the down-converter 114 to reduce the frequency of the input signal. Thus, the down-converter 114 includes a second test connection that receives an output radio frequency signal (RF) from the device under test 106. The down-converter 114 also uses the local oscillator signal LO to convert the output radio frequency signal (RF) to an output intermediate frequency signal (IF) by reducing the frequency of the output radio frequency signal (but not otherwise altering the output radio frequency signal). Therefore, both the up-converter 112 and the down-converter 114 share the same LO.

Such structures further include a synchronized digitizer 116, connected to the down-converter 114, that receives the output intermediate frequency signal from the down-converter 114. The synchronized digitizer 116 is connected to the reference signal generator 102 and also receives the reference signal from the reference signal generator 102. The synchronized digitizer 116 uses the reference signal to convert the output intermediate frequency signal to a digital output signal. The synchronized digitizer 116 (potentially with operation of a separate logic device 118) maintains different phase signals of the output intermediate frequency signal from the down-converter 114 as the device under test 106 is operated during a testing cycle. Note that the down-converter 114, the synchronized digitizer 116, and the logic device 118 make up what is referred to as the "receiver" 108, which receives the RF signal from the device under test 106.

The logic device 118 can be a field programmable grid array (FPGA), a separate processor 124, or similar device. The logic device 118 may be separate, or incorporated as a component of the synchronized digitizer 116. The logic device 118 converts the digitized signal from the frequency domain to the time domain or uses the fast Fourier transform (FFT), etc. The reference signal supplied to the local oscillator 122, the source oscillator 110, the digitizer 116, and the logic device 118 is the same (e.g., a single) signal, so as to eliminate phase errors by canceling out the phase noise effect between different devices, and to further increase accuracy.

Also, as shown in FIG. 1, the processor 124 can be connected to the device under test 106 and the synchronized digitizer 116. The processor 124 can control the device under test 106 to process the test radio frequency signal at different phase/port steps at different times of the testing cycle. The processor 124 can control the source oscillator 110 to generate different test signals. The synchronized digitizer 116 continuously receives the output intermediate frequency signal from the down-converter 114 during the full (all of the) testing cycle. The full testing cycle can supply different test signals to the device under test 106, cause the device under test 106 to operate at different phase offsets, cause the device under test 106 to operate using different ports, etc. Note that operating the device under test 106 at different phase offsets, or to use different ports, is sometimes referred to as "different phase/port steps of the testing cycle" herein for shorthand convenience.

Figure 2:
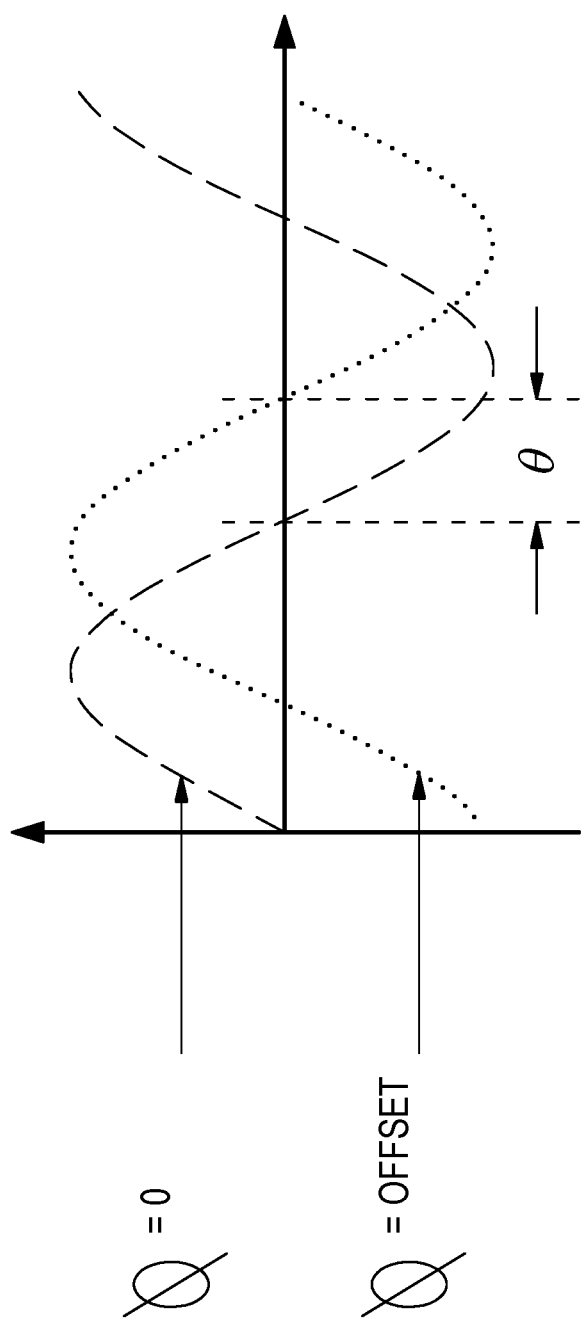
FIG. 2 is a graph illustrating phase signals produced by embodiments herein.

FIG. 2 illustrates two different phase signals relating to different phase/port steps of such a testing cycle, combined and overlaid on one another by the synchronized digitizer 116 (potentially in coordination with the logic device 118). The synchronized digitizer 116 combines together and overlays such different phase/port signals relating to different phase/port steps of the testing cycle synchronized with one another. This is shown for example in FIG. 2 where one sine wave signal has zero phase step (is at a zero phase offset) while the other sine wave signal is offset and has phase step, with the phase difference being represented as Φ in the drawings.

Figure 3:
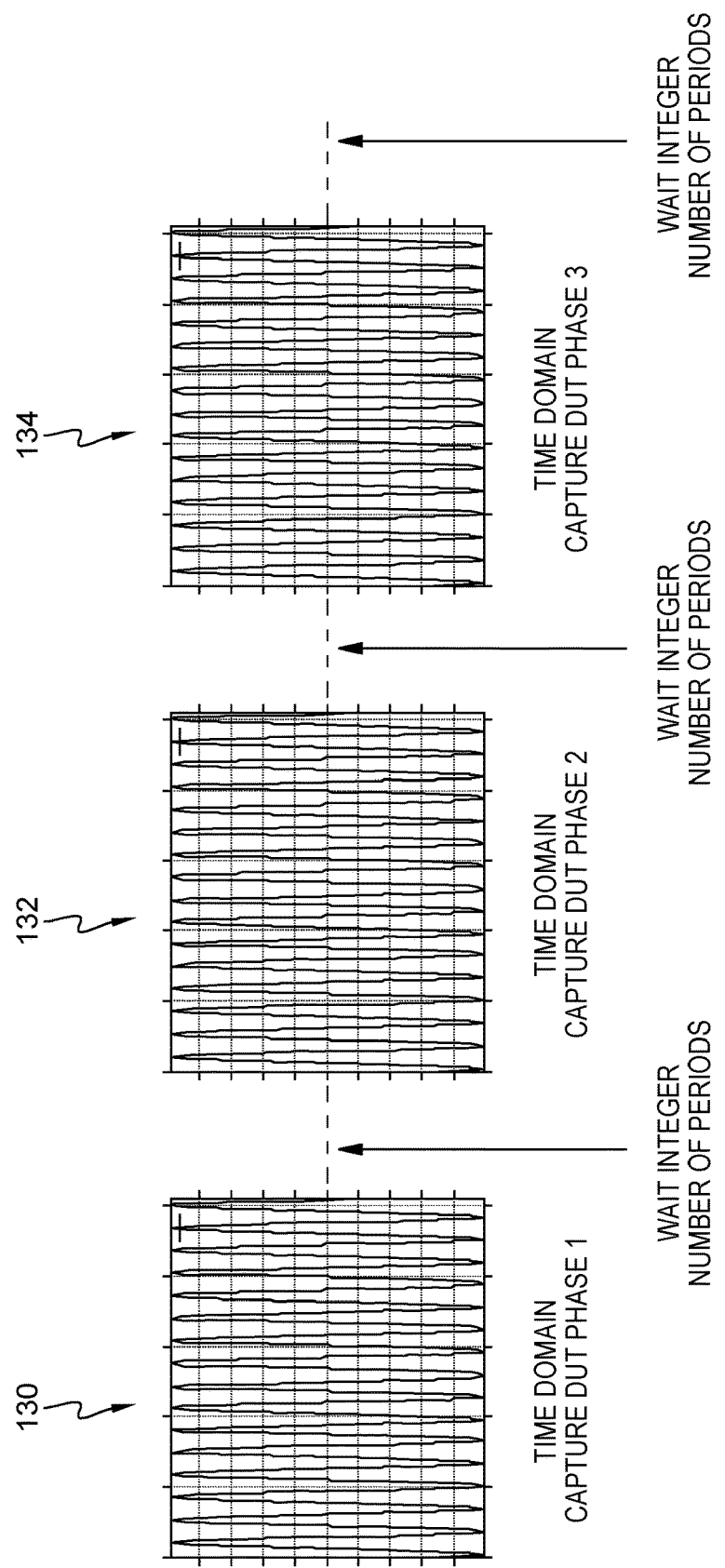
FIG. 3 is an illustration of graphs showing pausing between phase/port steps performed by embodiments herein.

As also shown in FIG. 3, the processor 124 controls the synchronized digitizer 116 to wait whole integer frequency periods (e.g., 5 periods, 10 periods, 25 periods, etc.) between capturing the different phase signals relating to different phase/port steps of the testing cycle. More specifically, item 130 in FIG. 3 illustrates the time domain signal produced by the logic device 118 during a first phase step, while items 132 and 134 illustrate other time domain signals produced for other phase/port steps. Note that, as shown in FIG. 3, the synchronized digitizer 116 does not capture signals and the logic device 118 does not convert such signals during whole integer frequency periods that are skipped after the processor 124 has moved the device under test 106 to operation under a different phase (or different port). This waiting period is selected to be long enough to allow the output intermediate frequency signals from the down-converter 114 to stabilize; however, because the synchronized digitizer 116 continuously receives such signals, the signals relating to the different phase/port steps are all synchronized with one another (which would not be the case if the digitizer were disabled between phase/port steps, or if different digitizers were used for different phase/port steps). This allows such signals to be accurately combined and overlaid with one another, and to thereby accurately provide a phase difference (Φ) between such overlaid signals.

The processor 124 evaluates offset of the different phases combined and overlaid by the synchronized digitizer 116 (e.g., as shown in FIG. 2) to determine whether phases of digital output signals relating to the different phase/port steps of the device under test 106 are within limits to determine whether the device under test 106 passes the testing cycle. As would be understood by those ordinarily skilled in the art the various "limits" that are tested can be boundaries (ranges) or thresholds relating to phase offsets, frequency changes, amplitude changes, wave shape changes, wave regularities, etc., or any similar measures.

As shown in flowchart form in FIG. 4, various methods herein begin by establishing an initial device under test (DUT) reference phase in item 200 that the source oscillator uses to generate the test intermediate frequency signal. In item 202, these methods generate/output a reference signal using a reference signal generator. Then, in item 204 such methods generate and output a local oscillator (LO) signal from a local oscillator using the reference signal produced by the reference signal generator in item 202. Similarly, in item 206, such methods generate/output a test intermediate frequency (IF) signal from the source oscillator using the reference signal generated in item 202.

In item 208, these methods convert the test intermediate frequency signal to a test radio frequency (RF) signal, with an up-converter using the local oscillator signal produced in item 204. The test radio frequency signal is supplied to a device under test in item 210. In item 212, a logic device controls the device under test to process the test radio frequency signal at different phase/port steps at different times of the testing cycle. An output radio frequency signal is received back from the device under test in item 214.

Such methods convert the output radio frequency signal to an output intermediate frequency signal in item 216, with a down-converter using the same local oscillator signal produced in item 204. Then, in item 218, the methods convert the output intermediate frequency signal to a digital output signal, with a synchronized digitizer using the same reference signal produced in item 202. Again, the reference signal supplied to the local oscillator, the source oscillator and the digitizer is the same (e.g., a single) signal produced in item 202.

If the phase or port of the DUT has been changed (in item 224, discussed below) before testing the DUT in item 212, such processing waits (in item 220) a specific whole integer of frequency periods before capturing the digital output signal in item 222. Thus, after waiting in item 220, these methods capture and overlay the digital output signal in item 222, and this produces the overlaid waveforms show in FIG. 2, which allows the phase difference of offset (Φ) between such overlaid signals to be calculated (in item 226 discussed below). The phase of the device under test, or the device under test port, is changed in item 224, and processing loops back to item 212 to operate the device under test at the new phase or new port.

Thus, these methods to capture different phase signals of the output intermediate frequency signal using the synchronized digitizer as the device under test is operated during a testing cycle 222. In other words, the methods herein continuously capture the different phase signals (using the synchronized digitizer) which relate to different phase/port steps of the testing cycle, and these are synchronized with one another when combined and overlaid by the synchronized digitizer in item 222. These methods capture such different phase signals in item 222 by having the synchronized digitizer continuously receive the output intermediate frequency signal from the down-converter in item 218 during the entire (all of the) testing cycle, but the logic device controls the synchronized digitizer to wait whole integer frequency periods (item 220) between capturing the different phase signals relating to different phase/port steps of the testing cycle in item 222 to avoid capturing signals from the down-converter 114 that are not stabilized, but to still keep all captured signals synchronized with the other captured signals.

In item 224, so long as there are additional phase offsets and ports to test, processing loops back to item 212 to operate the DUT at the changed phase offset or changed port. Once all phases/ports of the DUT have been tested, in item 226 the logic device is used by such methods to evaluate the offset of the different phases combined and overlaid by the synchronized digitizer (in item 222) to determine whether phases of digital output signals relating to the different phase/port steps of the device under test are within limits, to determine whether the device under test passes the testing cycle (item 228). More specifically, the phase offsets may be in specific increment (e.g., 5 degrees, 10 degrees, 30 degrees, etc.) and if the DUT produces a phase offset that is more than a threshold (e.g., 1%, 5%, 10%, etc.) different from the phase offset expected, the DUT will fail the test. Some (e.g., 2, 4, 10, etc.) phase offsets can be overlaid and compared in groups, or all phase offsets can be overlaid and compared as a single group. In other implementations, a group of offsets (or all individual offsets overlaid together) of a DUT may be averaged to determine if the DUT passes or fails. Similar evaluations can be performed in item 228 relating to the outputs expected when different ports of the DUT are selected.

Figure 5:
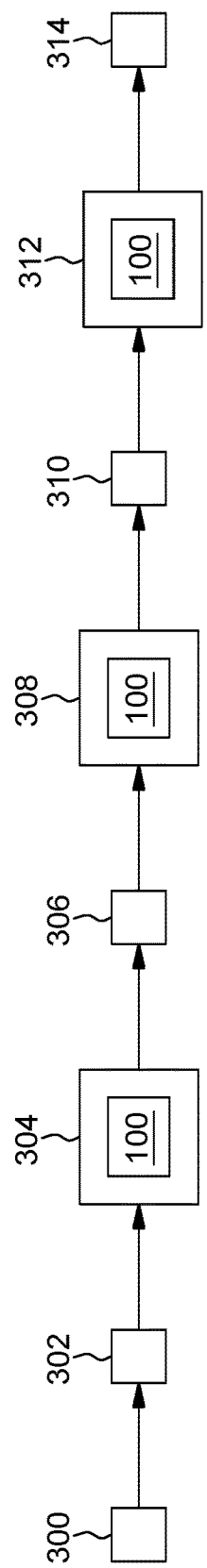
FIGS. 5 and 6 are schematic diagrams of hardware systems used by embodiments herein.

FIG. 5 conceptually illustrates a hardware configuration for manufacturing and testing such RF devices. More specifically, a design is created or accessed in item 300, and initial manufacturing can be performed in fabrication unit A (302) to produce partially formed RF devices, or components thereof, according to the design. These partially formed RF devices can optionally be tested using one testing unit A (304) that includes the testing apparatus 100 shown in FIG. 1, discussed above.

Additional manufacturing can be performed in fabrication unit B (306) to produce completely formed RF devices. These fully formed RF devices can optionally be tested using another (or the same) testing unit B (308) that includes the testing apparatus 100 shown in FIG. 1, discussed above. After such testing, various assembly processes may be performed to package the fully formed RF devices with other devices (in assembly unit 310) to produce a fully formed product. Such a fully formed product can also be tested using yet another testing unit C (312) that includes the testing apparatus 100 shown in FIG. 1, discussed above. After such final optional testing using testing unit C (312), the fully formed product can be put into operation in the field 314 for a full operational life span.

Note that the testing units A-C (304, 308, 312) can all be the same unit (where partially or fully formed items return to the same single testing unit for testing), or can be separate units. Further, such testing units A-C (304, 308, 312) are not bench testers, but are in-line with the fabrication (302, 306) and assembly 310 units. Therefore, the testing apparatus 100 discussed above is capable of testing each and every partially or fully formed component or device, without substantially slowing production or increasing costs, because the testing apparatus 100 is relatively smaller, faster, and less expensive than bench test devices. This potentially allows every RF device to be tested before use, which is useful when such RF devices are designed to perform with millimeter wavelengths operating at very high frequencies and have the ability to operate at different phases of a given frequency signal, and/or through different ports of the RF devices.

Figure 6:
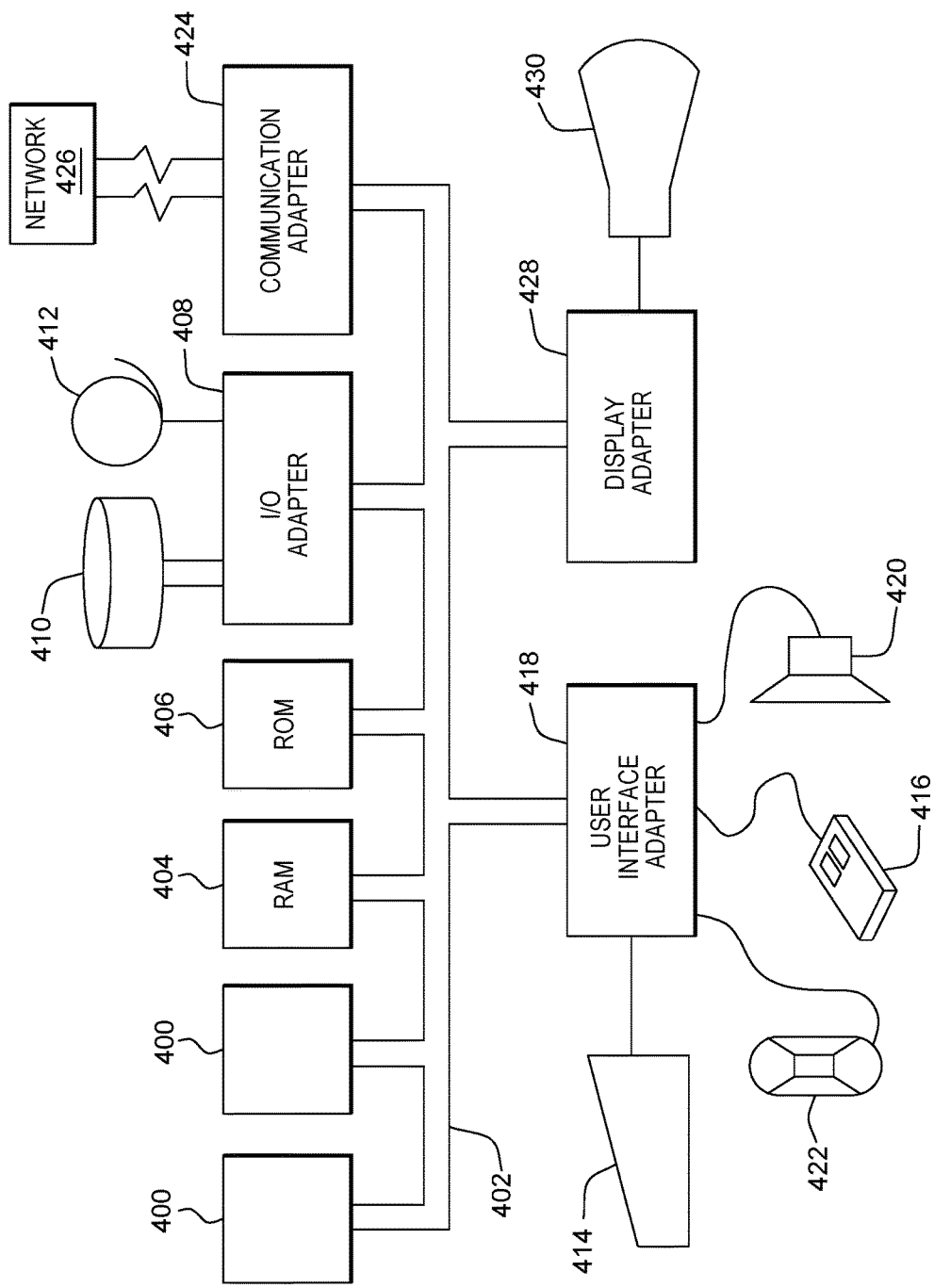

FIG. 6 presents a schematic drawing illustrates a hardware configuration that can perform any of the logic or control functions described above. The system incorporates at least one processor or central processing unit (CPU) 400. The CPUs 400 are interconnected via a system bus 402 to various devices such as a random access memory (RAM) 404, read-only memory (ROM) 406, and an input/output (I/O) adapter 408. The I/O adapter 408 can connect to peripheral devices, such as disk units 410 and tape drives 412, or other program storage devices that are readable by the system. The system can read the inventive instructions on the program storage devices and follow these instructions to execute the methodology of the embodiments herein. The system further includes a user interface adapter 418 that connects a keyboard 414, mouse 416, speaker 420, microphone 422, and/or other user interface devices such as a touch screen device (not shown) to the bus 402 to gather user input. Additionally, a communication adapter 424 connects the bus 402 to a data processing network 426, and a display adapter 428 connects the bus 402 to a display device 430 which may be embodied as an output device such as a monitor, printer, or transmitter, for example.

The flowchart and block diagrams in the figures illustrate the architecture, functionality, and operation of possible implementations of devices and methods according to various embodiments. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Each respective figure, in addition to illustrating methods of and functionality of the present embodiments at various stages, also illustrates the logic of the method as implemented, in whole or in part, by one or more devices and structures. Such devices and structures are configured to (i.e., include one or more components, such as resistors, capacitors, transistors and the like that are connected to enable the performing of a process) implement the method described above. In other words, one or more computer hardware devices can be created that are configured to implement the method and processes described herein with reference to the figures and their corresponding descriptions.

Embodiments herein may be used in a variety of electronic applications, including but not limited to advanced sensors, memory/data storage, semiconductors, microprocessors and other applications. A resulting device and structure, such as an integrated circuit (IC) chip can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments herein. The embodiments were chosen and described in order to best explain the principles of such, and the practical application, and to enable others of ordinary skill in the art to understand the various embodiments with various modifications as are suited to the particular use contemplated.

While the foregoing has been described in detail in connection with only a limited number of embodiments, it should be readily understood that the embodiments herein are not limited to such disclosure. Rather, the elements herein can be modified to incorporate any number of variations, alterations, substitutions or equivalent arrangements not heretofore described, but which are commensurate with the spirit and scope herein. Additionally, while various embodiments have been described, it is to be understood that aspects herein may be included by only some of the described embodiments. Accordingly, the claims below are not to be seen as limited by the foregoing description. A reference to an element in the singular is not intended to mean "one and only one" unless specifically stated, but rather "one or more." All structural and functional equivalents to the elements of the various embodiments described throughout this disclosure that are known or later, come to be known, to those of ordinary skill in the art are expressly incorporated herein by reference and intended to be encompassed by this disclosure. It is therefore to be understood that changes may be made in the particular embodiments disclosed which are within the scope of the foregoing as outlined by the appended claims.

What is claimed is:

1. A test device comprising:
   a local oscillator outputting a local oscillator signal using a reference signal;
   a source oscillator outputting a test intermediate frequency signal using the reference signal;
   an up-converter using the local oscillator signal to convert the test intermediate frequency signal to a test radio frequency signal supplied to a device under test;
   a down-converter receiving an output radio frequency signal from the device under test, and wherein the down-converter uses the local oscillator signal to convert the output radio frequency signal to an output intermediate frequency signal; and
   a digitizer receiving the output intermediate frequency signal from the down-converter, wherein the digitizer uses the reference signal to convert the output intermediate frequency signal to a digital output signal, wherein the digitizer captures different phase signals of the output intermediate frequency signal from the down-converter as the device under test is operated at different phase/port steps during a testing cycle.

2. The test device in claim 1, further comprising a logic device connected to the device under test and the digitizer, wherein the logic device controls the device under test to process the test radio frequency signal at the different phase/port steps at different times of the testing cycle.

3. The test device in claim 2, wherein the digitizer continuously receives the output intermediate frequency signal from the down-converter during all of the testing cycle, and wherein the logic device controls the digitizer to wait whole integer frequency periods between capturing the different phase signals relating to different phase/port steps of the testing cycle.

4. The test device in claim 3, wherein the digitizer combines together and overlays the different phase signals relating to different phase/port steps of the testing cycle with one another.

5. The test device in claim 2, wherein the logic device evaluates offset of the different phases combined and overlaid by the digitizer to determine whether phases of digital output signals relating to the different phase/port steps of the device under test are within limits to determine whether the device under test passes the testing cycle.

6. The test device in claim 1, wherein the reference signal supplied to the local oscillator, the source oscillator and the digitizer is a single signal.

7. The test device in claim 1, wherein the digitizer converts the output intermediate frequency signal from a frequency domain to a time domain or uses a fast Fourier transform.

8. A radio frequency test device comprising:
a reference signal generator producing a reference signal;
a local oscillator connected to the reference signal generator and receiving the reference signal from the reference signal generator, wherein the local oscillator outputs a local oscillator signal using the reference signal;
a splitter connected to the local oscillator and receiving the local oscillator signal from the local oscillator;
a source oscillator connected to the reference signal generator and receiving the reference signal from the reference signal generator, wherein the source oscillator outputs a test intermediate frequency signal using the reference signal;
an up-converter connected to the splitter and receiving the local oscillator signal from the splitter, wherein the up-converter uses the local oscillator signal to convert the test intermediate frequency signal to a test radio frequency signal, and wherein the up-converter has a first test connection supplying the test radio frequency signal to a device under test;
a down-converter connected to the splitter and receiving the local oscillator signal from the splitter, wherein the down-converter includes a second test connection receiving an output radio frequency signal from the device under test, and wherein the down-converter uses the local oscillator signal to convert the output radio frequency signal to an output intermediate frequency signal; and
a synchronized digitizer connected to the down-converter and receiving the output intermediate frequency signal from the down-converter, wherein the synchronized digitizer is connected to the reference signal generator and receives the reference signal from the reference signal generator, wherein the synchronized digitizer uses the reference signal to convert the output intermediate frequency signal to a digital output signal,
wherein the synchronized digitizer captures and maintains different phase signals of the output intermediate frequency signal from the down-converter as the device under test is operated at different phase/port steps during a testing cycle.

9. The radio frequency test device in claim 8, further comprising a logic device connected to the device under test and the synchronized digitizer, wherein the logic device controls the device under test to process the test radio frequency signal at different phase/port steps at different times of the testing cycle.

10. The radio frequency test device in claim 9, wherein the synchronized digitizer continuously receives the output intermediate frequency signal from the down-converter during all of the testing cycle, and wherein the logic device controls the synchronized digitizer to wait whole integer frequency periods between capturing the different phase signals relating to different phase/port steps of the testing cycle.

11. The radio frequency test device in claim 10, wherein the synchronized digitizer combines together and overlays the different phase signals relating to different phase/port steps of the testing cycle synchronized with one another.

12. The radio frequency test device in claim 9, wherein the logic device evaluates offset of the different phases combined and overlaid by the synchronized digitizer to determine whether phases of digital output signals relating to the different phase/port steps of the device under test are within limits to determine whether the device under test passes the testing cycle.

13. The radio frequency test device in claim 8, wherein the reference signal supplied to the local oscillator, the source oscillator and the synchronized digitizer is a single signal.

14. The radio frequency test device in claim 8, wherein the synchronized digitizer converts the output intermediate frequency signal from a frequency domain to a time domain or uses a fast Fourier transform.

15. A test method comprising:
outputting a local oscillator signal from a local oscillator using a reference signal;
outputting a test intermediate frequency signal from a source oscillator using the reference signal;
converting the test intermediate frequency signal to a test radio frequency signal, by an up-converter using the local oscillator signal;
supplying the test radio frequency signal to a device under test;
receiving an output radio frequency signal from the device under test;
converting the output radio frequency signal to an output intermediate frequency signal, by a down-converter using the local oscillator signal;
converting the output intermediate frequency signal to a digital output signal, by a synchronized digitizer using the reference signal; and
capturing different phase signals of the output intermediate frequency signal using the synchronized digitizer as the device under test is operated at different phase/port steps during a testing cycle.

16. The test method in claim 15, further comprising controlling the device under test to process the test radio frequency signal at different phase/port steps at different times of the testing cycle, using a logic device.

17. The test method in claim 16, wherein the capturing different phase signals comprises continuously receiving the output intermediate frequency signal from the down-converter by the synchronized digitizer during all of the testing cycle, and controlling the synchronized digitizer to wait whole integer frequency periods between capturing the different phase signals relating to different phase/port steps of the testing cycle using the logic device.

18. The test method in claim 17, wherein the capturing different phase signals comprises simultaneously outputting the different phase signals relating to different phase/port steps of the testing cycle synchronized with one another from the synchronized digitizer.

19. The test method in claim 16, further comprising evaluating offset of the different phases combined and overlaid by the synchronized digitizer to determine whether phases of digital output signals relating to the different phase/port steps of the device under test are within limits to determine whether the device under test passes the testing cycle, using the logic device.

20. The test method in claim 15, wherein the reference signal used by the local oscillator, the source oscillator and the synchronized digitizer is a single signal.

* * * * *